US011399653B2

(12) United States Patent
Rivera

(10) Patent No.: US 11,399,653 B2
(45) Date of Patent: Aug. 2, 2022

(54) BEVERAGE BREWING SYSTEM

(71) Applicant: Adrian Rivera, Whittier, CA (US)

(72) Inventor: Adrian Rivera, Whittier, CA (US)

( * ) Notice: Subject to any disclaimer, the term of this patent is extended or adjusted under 35 U.S.C. 154(b) by 455 days.

(21) Appl. No.: 16/455,233

(22) Filed: Jun. 27, 2019

(65) Prior Publication Data

US 2020/0154930 A1 May 21, 2020

Related U.S. Application Data

(60) Provisional application No. 62/722,568, filed on Aug. 24, 2018.

(51) Int. Cl.
*A47J 31/20* (2006.01)
*A47J 31/06* (2006.01)
*A47J 31/44* (2006.01)
*A47J 31/053* (2006.01)
*A47J 31/00* (2006.01)

(52) U.S. Cl.
CPC ......... *A47J 31/0689* (2013.01); *A47J 31/053* (2013.01); *A47J 31/0636* (2013.01); *A47J 31/20* (2013.01); *A47J 31/441* (2013.01); *A47J 31/4407* (2013.01); *A47J 31/4457* (2013.01); *A47J 31/005* (2013.01)

(58) Field of Classification Search
CPC ......... A47J 31/18; A47J 31/20; A47J 31/053; A47J 31/005; A47J 31/0636
USPC .......................................................... 99/306
See application file for complete search history.

(56) References Cited

U.S. PATENT DOCUMENTS

| 3,181,951 | A | * | 5/1965 | Gronvold | A47J 31/20 |
| | | | | | 426/433 |
| 5,868,062 | A | * | 2/1999 | Enomoto | A47J 31/0573 |
| | | | | | 99/308 |
| 8,096,230 | B2 | * | 1/2012 | Levin | A47J 31/005 |
| | | | | | 99/295 |
| 10,258,185 | B2 | * | 4/2019 | Hyman | A47J 31/56 |
| 2002/0029694 | A1 | * | 3/2002 | Wong | A47J 31/053 |
| | | | | | 99/308 |
| 2009/0246341 | A1 | * | 10/2009 | Pitner | A23F 3/16 |
| | | | | | 99/298 |
| 2012/0269025 | A1 | * | 10/2012 | Liu | B01F 13/0022 |
| | | | | | 366/129 |
| 2015/0000533 | A1 | * | 1/2015 | Ha | A47J 31/18 |
| | | | | | 99/283 |
| 2018/0368612 | A1 | * | 12/2018 | Stein | A47J 31/52 |
| 2019/0191913 | A1 | * | 6/2019 | Richardson | A47J 31/0576 |

FOREIGN PATENT DOCUMENTS

| CA | 2989054 A1 * | 12/2016 | A47J 31/20 |
| WO | WO-2012090126 A1 * | 7/2012 | A23F 3/18 |

* cited by examiner

*Primary Examiner* — Reginald Alexander
(74) *Attorney, Agent, or Firm* — IP Strategies

(57) ABSTRACT

A beverage brewer includes a container configured to hold liquid and having an open top, and a brewing material holder configured to be suspended into the container and to hold beverage brewing material in contact with liquid held in the container. The brewer also includes a pressure assembly operable to provide pressurized liquid flow through the brewing material holder within the container, and/or a heating element configured to be arranged at least partially in an interior of the container and operable to heat liquid held in the container.

49 Claims, 15 Drawing Sheets

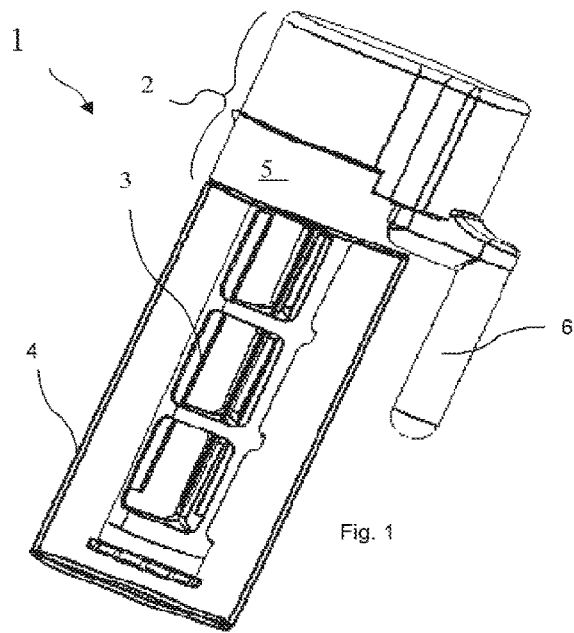
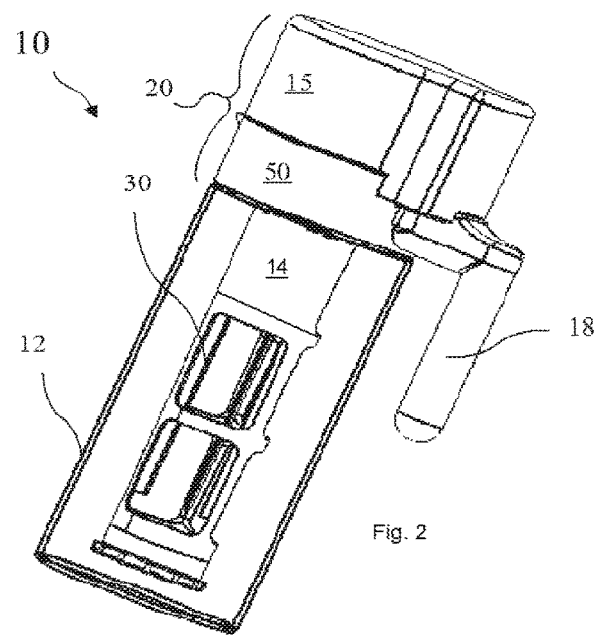
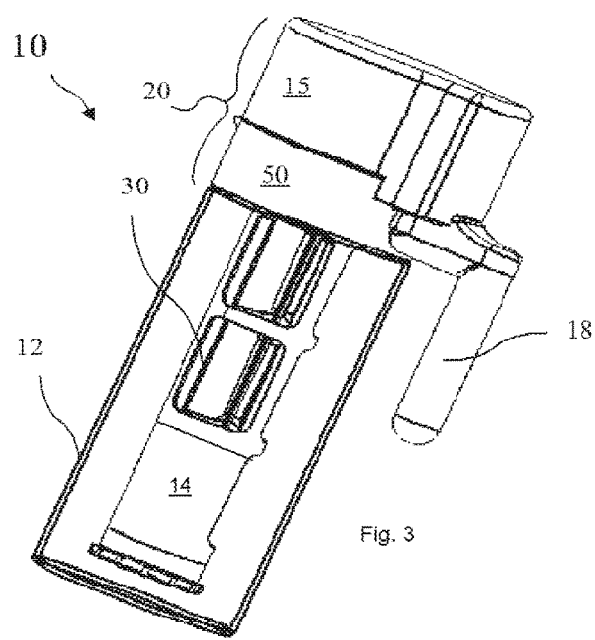

BEVERAGE BREWING SYSTEM

CROSS-REFERENCE TO RELATED APPLICATION

This is related to and claims priority from co-pending U.S. Provisional Application for Patent No. 62722568, which was filed on Aug. 24, 2018, the entire disclosure of which is incorporated herein. This disclosure is also related to U.S. patent application Ser. No. 16/290,537, which was filed on Mar. 1, 2019, the entire disclosure of which is incorporated herein.

FIELD OF THE INVENTION

The present invention relates to beverage brewing and in particular to a brewing device for hot or cold brewing of beverages.

BACKGROUND OF THE INVENTION

Several types of beverages, such as coffee, tea, and herbal drinks, are brewed by infusing or steeping ground or shredded beverage material in water or other liquid. For quick brewing, hot water is typically used. However, cold brewing, that is, infusion of the beverage material in cold or room-temperature water rather than in hot water, is sometimes preferred. For example, some coffee drinkers prefer the flavor provided by cold brewing, and bitterness and acidity can be avoided when brewing certain teas by steeping in unheated water rather than hot water. Such cold brewing is accomplished by submerging a portion of brewing material in unheated water for a period of time to allow the brewing material to infuse the water. While the steeping process may provide a desired result, the time required for cold brewing is longer than that required for brewing in hot water.

Conventional cold-brew steeps require a user to measure and pour a particular amount of brewing material into the steep liquid. A pre-measured simple drop-in portion of brewing material would be convenient, particularly for use in a brewer that simplifies removal of the brewing material and clean-up of the brewer. A brewer that can be used for both hot- and cold-brewing would provide flexibility, and it would be advantageous if the brewer would be configured to speed the cold-brewing process. A further advantage would be provided by a brewer that could replicate the effect of a French press, by adding a compression feature to the brewing process. The ability to use either loose beverage brewing material or pre-packaged brewing material in a capsule or other container would make such a brewer universally useful.

It would also be advantageous to provide a feature by which the brewing time is reduced when the beverage is cold-brewed. Many people prefer the taste of a cold-brewed beverage, but cold-brewing typically takes a much longer time than does traditional hot-brewing. Adding an agitation or rotation action to the cold-brewing process has been shown to reduce the cold-brewing time. Another manner of speeding the process would be to increase a rate of flow of brewing liquid through the brewing material. Some conventional devices use a gravity feed to draw water through the brewing material using a percolator-type action, which speeds brewing time somewhat. However, these systems tend to have a motorized system outside the brewing container to provide the gravity action, resulting in a brewer having a large footprint that takes up considerable counter space. Also, the complexity of these systems makes them difficult to clean properly and exposes users to potential build-up of bacteria and other contaminants that affect the taste of the beverage and the health of the user.

Therefore, a reliable, rapid cold-brewing system that uses a pressure feed to increase the rate of fluid flow would provide an overall improved brewing experience. Additional benefit would be provided if the system were to give a user the option to compact the brewing material while increasing the fluid flow. It would also be advantageous if such a system could be configured as a compact unit, preferably as a sealed system to preserve the integrity of the brewed beverage. Flexibility would be provided if the brewing system can also be used to hot-brew a beverage, or if it can be used to warm a beverage that had been cold-brewed by the system, in order to serve a warm or hot beverage that has the cold-brew taste, and if brewing parameters were selectable to customize the resulting beverage.

BRIEF SUMMARY OF THE INVENTION

The present invention addresses the above and other needs by providing a hot/cold beverage brewing system that reduces the time required to cold-brew coffee and other beverages. The system includes a pressure assembly to draw liquid through the brewing material to provide the advantages of cold-brewing while substantially reducing the time needed to brew a beverage. The system of the invention can also hot-brew a beverage, or warm a beverage that had previously been cold-brewed by the system. As used herein, the term "cold-brew" means the action of brewing using an unheated liquid; the brewing liquid can be cold, but instead can be room temperature and doesn't necessarily have to be chilled.

The brewer includes a container, and a brewing material holder configured to be coupled to a lid or top portion of the container such that it is suspended from the lid or top portion, or to be otherwise positioned such that the brewing material holder can be arranged within the container. The brewing material holder is lined in a mesh material or includes one or more mesh panels so that it is able to retain brewing material in the brewing material holder while allowing liquid to pass through the holder and therefore through the brewing material within the holder. For example, the mesh can be a fine nylon mesh or a 75-100 micron opening nylon mesh, or a metal mesh material. A beverage can be hot-brewed by filling the container with hot liquid, and submerging beverage material held in the brewing material holder into the hot liquid, held in place by the lid or other arrangement. Likewise, a beverage can be cold-brewed by filling the container with unheated liquid and submerging the brewing material held in the holder in the liquid.

In addition, a pressure assembly can be coupled to the brewing material holder. The pressure assembly can be arranged at or near the top of the container, such as coupled to the lid to hold it in place, and also to the brewing material holder to draw or push liquid through the brewing material holder within the container so as to brew the brewing material in the brewing material holder. For example, an impeller or pump can be used as part of a pressure assembly to generate pressure and draw the liquid. Alternatively, the pressure assembly can be coupled below the brewing material holder. In any case, the pressure assembly draws or pushes liquid from the container through the brewing material in the brewing material holder under pressure so as to more rapidly brew the beverage. The pressure flow can be used whether or not the liquid is heated.

To brew a beverage using the pressure assembly, water or other liquid is added into the container and brewing material is disposed in the brewing material holder, which is submerged in the container, suspended in the container, for example, by the lid, with the pressure assembly coupled above or below it. The pressure assembly then rapidly flows liquid from the container through the brewing material holder and therefore through the brewing material. The pressurized flow of the liquid through the brewing material substantially reduces the time required for cold brewing. The brewing material added to the holder can be loose material, or a prepackaged capsule or other container of brewing material. The brewing material can be arranged in a mesh sack, either pre-packaged or packed by the user. In this case the brewing material holder need not have mesh portions or panels, and need only have open areas that allow the liquid to flow through the holder, but are spaced closely enough to prevent the sack from leaving the interior of the brewing material holder.

According to an aspect of the invention, a beverage brewing device includes a brewing material holder, and an impeller assembly configured to rotate and thereby draw liquid from the container through the brewing material holder. The impeller assembly includes a drive assembly configured to rotate an impeller coupled to the drive assembly. The drive assembly can be of any type known to those of skill in the art. For example, it can include a mechanical drive mechanism that is battery-powered, powered by AC current, or manually powered, such as by turning a crank handle. For example, the impeller can include a disk with fins that induce a pressure difference in liquid when rotated about a shaft, which in turn draws or pushes the liquid through the brewing material holder. Passing pressurized liquid through the brewing material in the holder significantly reduces cold brewing time. The impeller assembly can be configured in a housing that couples to the brewing material holder and has two ports, one to draw in liquid and one to expel liquid.

According to another aspect of the invention, a beverage brewing device includes a brewing material holder and a pump assembly configured to draw or push liquid from the container through the brewing material holder. The pump assembly is configured to induce a pressure difference in the liquid, so as to draw or push the liquid through the brewing material holder. Passing pressurized liquid through the brewing material in the holder significantly reduces cold brewing time. The pump assembly can be of any type known to those of skill in the art. For example, it can be a pump that is battery-powered, powered by AC current, or manually powered, such as by turning a crank handle. The pump assembly can be configured in a housing that couples to the brewing material holder and has two ports, one to draw in liquid and one to expel liquid.

It should be apparent to those of skill in the art that other mechanisms for providing a pressure differential can be used to draw the liquid through the brewing material holder, such as those using a canister of pressurized gas or an evacuated chamber, and the present invention is contemplated for use with any such mechanism.

It is noted that, regardless of which pressure assembly (impeller, pump, or other type) is used, the pressure differential that is produced can be used to push the liquid into the brewing material holder, or to pull the liquid through the brewing material holder. That is, the positive or negative pressure aspect of the pressure assembly can be used for brewing purposes, depending on how the overall brewing system is configured with respect to relative placement of the pressure assembly and the brewing material holder.

According to another aspect of the invention, the pressure (impeller or pump) assembly can be configured to couple directly with a prepackaged capsule of brewing material, so that the liquid will be pulled or pushed through the capsule, without the need for the brewing material holder. For example, in the case of a sealed capsule, the pressure assembly can have an injection needle that punctures the capsule and provides the liquid to the capsule, and an outflow tube that receives the brewed liquid from the capsule. The liquid can be provided to the capsule under positive pressure by the pressure assembly, which then forces the brewed beverage through the outflow tube. Alternatively, the pressure assembly can create a negative pressure at the outflow tube to draw liquid through the capsule via the injection needle. Other types of capsules, such as those having beverage material enclosed in mesh packets, can also be used advantageously with the pressure assembly of the present invention. Reusable capsules that a user can pack with loose beverage material of the user's choice and that accommodate the injection needle or tube and outflow tube can also be used with the beverage brewer.

According to another aspect of the invention, a heating element can be coupled to the lid, container, or pressure assembly, or can be integrally formed as part of the pressure assembly. The heating element is configured to be submerged in the liquid within the container and kept at a constant temperature, in order to evenly heat the liquid in the container as it brews. Heating the liquid in this manner speeds the brewing process, particularly if used in coordination with the pressure assembly, which circulates the liquid in the container and therefore allows the liquid to reach the constant temperature more quickly and helps to compensate for any temperature loss through the sidewall of the container or for temperature gradients that could affect the consistency of the brewed beverage. The temperature of the heating element can be kept at a level that is lower than that typically used to hot-brew a beverage, and therefore brewing in this manner results in a beverage having lower acidity than a hot brew and also having other beneficial qualities of a cold-brewed beverage. Alternatively, the beverage can be cold-brewed by the system, with or without the use of the pressure assembly, and then heated by the heating element to the desired drinking temperature before serving, so as to provide cold-brew flavor but a warmer serving temperature. As another alternative, the liquid can be heated to a high temperature while the pressure assembly slowly circulates the liquid, to achieve something close to a traditional hot-brew arrangement. In general, various combinations of heating and flow rate can be set to brew a beverage according to a particular user's specifications.

Generally, according to an aspect of the invention, a beverage brewer includes a container configured to hold liquid and having an open top, a brewing material holder configured to hold beverage brewing material, and a pressure assembly operable to provide pressurized liquid flow through the brewing material holder within the container.

The brewing material holder can be configured to be suspended into the container and to hold the beverage brewing material in contact with liquid held in the container.

The pressure assembly can be configured to be removably coupled at the top of the container, and the brewing material holder can be configured to be removably coupled to the pressure assembly.

The pressure assembly can include a pump.

The beverage material holder can be sealed and include the beverage brewing material, such as a pre-packaged beverage pod. The pressure assembly can include a pump having an inlet port and an outlet port, an injection nozzle arranged at the outlet port and configured to pierce a seal of the beverage material holder and to provide liquid under pressure from the container to an interior of the beverage material holder in order to provide a brewed beverage from the beverage brewing material, and an outflow nozzle arranged in fluid communication with an interior of the container and configured to pierce the beverage material holder and provide the brewed beverage from the interior of the beverage material holder to the container. In this case, the pump can flow pressurized liquid through a pre-packaged beverage pod to brew a beverage.

The brewing material holder can be configured to be removably coupled at the top of the container, and the pressure assembly can be configured to be removably coupled to the brewing material holder.

The beverage brewer can also include a control assembly that is operable to control actuation of the pressure assembly, a direction of pressure provided by the pressure assembly, a level of pressure provided by the pressure assembly, and/or a duration of actuation of the pressure assembly.

The beverage brewer can also include a container lid configured to removably couple to the open top of the container. The pressure assembly can be configured to be removably coupled to the container lid, and the beverage material holder can be configured to be removably coupled to the pressure assembly. Alternatively, or in addition, the beverage material holder can be configured to be removably coupled to the container lid, and the pressure assembly can be configured to be removably coupled to the beverage material holder. The beverage brewer can also include a heating element that is configured to be removably coupled to the container lid such that at least a portion of the heating element is arranged in an interior of the container, operable to heat liquid held in the container.

Even without the lid, the beverage brewer can also include a heating element that is configured to be arranged at least partially in an interior of the container and operable to heat liquid held in the container. For example, the heating element can be configured to be removably coupled to the container such that at least a portion of the heating element is arranged in an interior of the container. Alternatively, or in addition, the heating element can be configured to be removably coupled to the pressure assembly such that at least a portion of the heating element is arranged in an interior of the container. Alternatively, or in addition, the heating element can be configured to be removably coupled to the beverage material holder such that at least a portion of the heating element is arranged in an interior of the container.

The beverage brewer can also include a control assembly that is operable to control at actuation of the heating element, a temperature of the heating element, and/or a duration of use of the heating element. This can be the same control assembly used to control aspects of operation of the pressure assembly, or can be a separate control assembly.

According to another aspect of the invention, a process of brewing a beverage includes providing beverage brewing material within the beverage material holder of the beverage brewer, and providing a liquid to the interior of the container. The pressure assembly is operated to provide pressurized flow of the liquid from the container through the brewing material holder, thereby brewing a beverage from the beverage brewing material, and the brewed beverage is provided to the container.

According to another general aspect of the invention, a beverage brewer includes a container configured to hold liquid and having an open top, a brewing material holder configured to hold beverage brewing material, and a heating element configured to be arranged at least partially in an interior of the container and operable to heat liquid held in the container. That is, the brewer can include the heater without the pressure assembly, in order to hot-brew a beverage, or to cold-brew a beverage without pressurized flow with the capability to warm the cold-brewed beverage to a desired drinking temperature.

The brewing material holder can be further configured to be suspended into the container, and to hold the beverage brewing material in contact with liquid held in the container.

The heating element can be configured to be removably coupled to the container such that at least a portion of the heating element is arranged in an interior of the container. Alternatively, or in addition, the heating element can be configured to be removably coupled to the beverage material holder such that at least a portion of the heating element is arranged in an interior of the container.

According to another aspect of the invention, a process of brewing a beverage includes providing beverage brewing material within the beverage material holder of the beverage brewer, and providing a liquid to the interior of the container. The heating element is operated to heat the liquid in the container, thereby brewing a beverage from the beverage brewing material. Of course, pressurized flow as described above also can be provided, but need not be provided.

The beverage brewer can also include a control assembly that is operable to control at least one of actuation of the heating element, a temperature of the heating element, and a duration of use of the heating element.

The beverage brewer can also include a container lid configured to removably couple to the open top of the container. The heating element can be configured to be removably coupled to the container lid such that at least a portion of the heating element is arranged in an interior of the container.

The beverage brewer can also include a pressure assembly operable to provide pressurized liquid flow through the brewing material holder within the container. The heating element can be configured to be removably coupled to the pressure assembly such that at least a portion of the heating element is arranged in an interior of the container.

The beverage brewer can also include a control assembly that is operable to control actuation of the pressure assembly, a direction of pressure provided by the pressure assembly, a level of pressure provided by the pressure assembly, and/or a duration of actuation of the pressure assembly. The container can include an indicator configured to denote a volume of the container, or a volume of liquid held in the container, and the control assembly can include a sensor configured to detect the indicator and to adjust the duration of actuation of the pressure assembly based at least in part on the denoted volume of the container or the denoted volume of the container.

According to another aspect of the invention, a beverage brewer includes container means for holding liquid having an open top, brewing material holding means for being suspended into the container means and for holding beverage brewing material in contact with liquid held in the container means, and pressure means for providing pressurized liquid flow through the brewing material holding means within the container means, The beverage brewer can also include heating means, arranged at least partially in an interior of the container means, for heating liquid held in the container means.

According to another aspect of the invention, a beverage brewer includes container means for holding liquid having an open top, brewing material holding means for being suspended into the container means and for holding beverage brewing material in contact with liquid held in the container means, and heating means, arranged at least partially in an interior of the container means, for heating liquid held in the container means.

BRIEF DESCRIPTION OF THE DRAWINGS

These and other aspects, features, and advantages of the present invention will be apparent from the following more detailed description thereof, with reference to the following drawings wherein:

FIG. 1 shows a conventional beverage brewing, system.

FIG. 2 shows an exemplary beverage brewing system including a pressure assembly.

FIG. 3 shows an exemplary beverage brewing system including a pressure assembly.

Corresponding reference characters indicate corresponding components throughout the several views of the drawings.

DETAILED DESCRIPTION OF THE INVENTION

Figure 5:
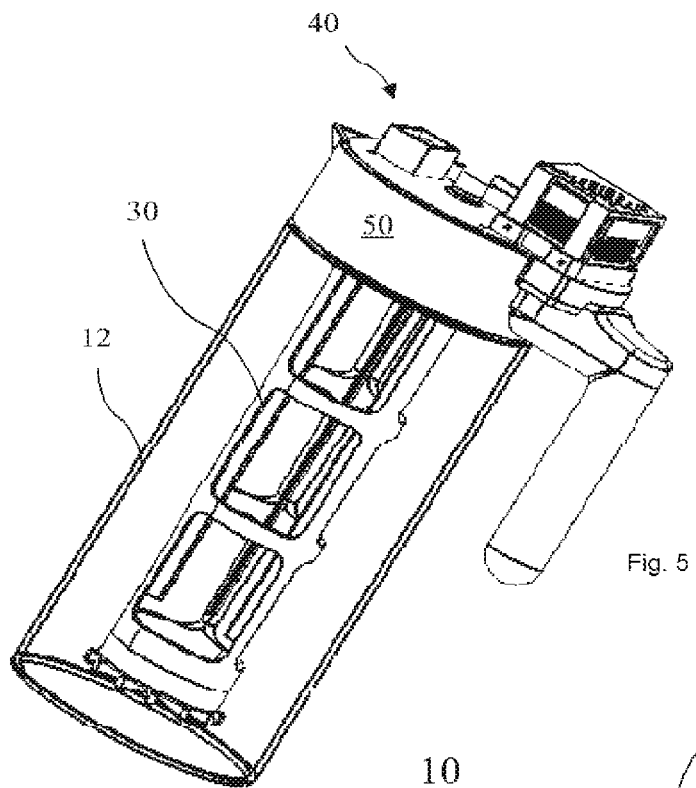
FIG. 5 shows an exemplary beverage brewing system with a control assembly.

A conventional beverage brewing device 1 is shown in FIG. 1. The beverage brewing device 1 includes a container 4 for holding water during brewing, which has an open mouth for attachment of a container cap 5 of a top 2. The container 4 can be made of any suitable material, such as plastic or glass, and can be transparent to allow viewing the beverage as it brews, although opaque or translucent materials can be used to form the container 4. A brewing material holder 3 is coupled to and suspended from the top 2. As shown, the brewing material holder 3 is lined with a mesh material or includes mesh panels. A handle 6 is attached to the beverage brewing device 1, for example at the top 2 as shown. To brew a beverage, hot or cold liquid is poured into the container. Brewing material is disposed inside the brewing material holder 3, which is then coupled to the top 2 and submerged in the liquid in the container, suspended from the top 2. Over time, the beverage is brewed. The time required to brew the beverage depends in part on the temperature of the liquid in the container, and the desired strength of the brewed beverage.

With reference to FIG. 2, a pressure assembly can be added to the conventional system of FIG. 1, or to any other similar type of beverage brewer, in order to speed the brewing time. The beverage brewing system 10 includes a container 12 for holding water during brewing, which has an open mouth for attachment of a container cap 50 of a top 20. The container 12 can be made of any suitable material, such as plastic or glass, and can be transparent to allow viewing the beverage as it brews, although opaque or translucent materials can be used to form the container 12. According to an exemplary embodiment, a brewing material holder 30 is coupled to and suspended from a pressure assembly 14, which in turn is coupled to and suspended from an inside portion of the top 20. As shown, the brewing material holder 30 is lined with a mesh material or includes mesh panels. The beverage brewing device 10 includes a handle 18 that is attached, for example, at the top 20 as shown, or in any other suitable location.

The pressure assembly 14 is coupled to the inside portion of the top 20 by any suitable means, such as by a threaded connection so that the top of the pressure assembly 14 screws into the inside portion of the top 20, although a snap-fit, friction-fit, or any other type of coupling mechanism can be used. The inside portion of the top 20 can have an extension pointing downward from the top 20 to properly position the pressure assembly 14 so that it is submerged in liquid within the container 12 when in use. Likewise, the brewing material holder 30 is coupled to the pressure assembly 14 by any suitable means, such as by a threaded connection so that the top of the brewing material holder 30 screws into the pressure assembly 14, although a snap-fit, friction-fit, or any other type of coupling mechanism can be used. A flexible, compressible ring, such as a silicone gasket, can be used at the mating surface between the pressure assembly 14 and the brewing material holder 30 to ensure a pressure-resistant fluid- seal fit to maximize the effectiveness of the pressurized brewing process.

The pressure assembly 14 is shown schematically, because the particular embodiment can be any one of numerous pressure assemblies that can be used as an element of the present invention to use pressure to increase the flow of liquid through the brewing material holder 30. For example, the pressure assembly 14 can be a pump, and further can be any type of pump, which creates a negative pressure at one port and a positive pressure at another port. Alternatively, the pressure assembly 14 can be a simple impeller connected to a drive assembly within a housing, which like the pump creates negative pressure at one port and corresponding positive pressure at another port. For example, the pressure assembly can create a negative pressure at the top of the brewing material holder 30, drawing water from the container 12 through the mesh in the holder 30, through the brewing material in the holder 30, and back through the other port of the pressure assembly for return to the liquid in the container 12.

Alternatively, the pressure assembly 14 can draw liquid directly from the container and inject pressurized liquid into the brewing material holder from the top, so that it forcefully passes through the brewing material in the holder to be expelled through the mesh portions of the holder. In either case, it is advantageous for the pump to have one port that interfaces with the brewing material holder 30 at the top of the brewing material holder, and another port that faces off to the side or above, in order to draw or expel liquid from or into the container 12. It would also be advantageous for the mesh panels in this case to be located toward the bottom end of the holder 30, and for there to be mesh disposed across the port of the pressure assembly 14 that interfaces with the holder 30.

The pressure assembly can be operated to provide continuous flow in either direction, to provide flow that pulses in either direction, or to provide flow that changes direction according to a predetermined pattern. Preferably, the rate and duration of flow can be set and/or programmed for flexibility.

The holder 30 can be elongated, squat, or any shape that will allow proper flow of the pressurized liquid through the beverage material. It would be advantageous for the coupling mechanism between the holder 30 and the pressure assembly 14 to be the same or compatible with the coupling mechanism between the pressure assembly 14 and the inside portion of the top 20, so that the holder 30 can be coupled directly to the inside portion of the top 20 if the user desires to use the beverage brewing system 10 conventionally, without the pressure assembly 14.

With reference to FIG. 3, the pressure assembly can instead be coupled such that the brewing material holder 30 is situated between the lid and the pressure assembly. According to an exemplary embodiment, the pressure assembly 14 is coupled to and suspended from the brewing material holder 30, which in turn is coupled to and suspended from an inside portion of the top 20. The pressure assembly 14 is coupled to brewing material holder 30 by any suitable means, such as by a threaded connection so that the top of the pressure assembly 14 screws into the brewing material holder 30, although a snap-fit, friction-fit, or any other type of coupling mechanism can be used. The inside portion of the top 20 can have an extension downward from the top 20 to properly position the brewing material holder 30 so that it is submerged in liquid within the container 12 when in use.

Likewise, the brewing material holder 30 is coupled to the inside portion of the top 20 by any suitable means, such as by a threaded connection so that the top of the brewing material holder 30 screws into the inside portion of the top 20, although a snap-fit, friction-fit, or any other type of coupling mechanism can be used. A flexible, compressible ring, such as a silicone gasket, can be used at the mating surface between the pressure assembly 14 and the brewing material holder 30 to ensure a pressure-resistant air-seal fit to maximize the effectiveness of the pressurized brewing process. Preferably, the end of the brewing material holder 30 facing the pressure assembly 14 has a mesh covering or panel, so as to prevent beverage material from being sucked into the pressure assembly 14 during use, and so that the beverage brewing system 10 can be used without the pressure assembly 14 in place.

The pressure assembly in this case can create a negative pressure at the bottom of the brewing material holder 30, drawing water from the container 12 through the mesh in the holder 30, through the brewing material in the holder 30, and back through the other port of the pressure assembly for return to the liquid in the container 12. Alternatively, the pressure assembly 14 can draw liquid directly from the container and inject pressurized liquid into the brewing material holder from the bottom, so that it forcefully passes through the brewing material in the holder to be expelled through the mesh portions of the holder. In either case, it is advantageous for the pump to have one port that interfaces with the brewing material holder 30 at the top of the brewing material holder, and another port that faces off to the side or downward, in order to draw or expel liquid from or into the container 12. It would also be advantageous for the mash panels in this case to be located toward the top end of the holder 30, and for there to be mesh disposed across the port of the pressure assembly 14 that interfaces with the holder 30. Preferably, the mesh at the interface is disposed on the holder 30, so that the beverage brewing system 10 can be used without the pressure assembly 14 if the user desires to brew beverages without pressure-produced flow.

According to this embodiment, a pre-formed beverage capsule can be used in place of the brewing material holder 30. Such a capsule is of the type used in single-serving and other beverage makers, in which a portion of ground beverage material is enclosed in a liquid-impermeable container. In typical use, the top and bottom of the capsule are pierced by tubular needles. Conventionally, the top needle provides hot or cold liquid to brew the beverage material and the bottom needle carries away the brewed beverage. In the present invention, the top 20 can carry a similar top needle and the pressure assembly 14 can carry the bottom needle, allowing for brewing of a beverage from beverage material held in the capsule rather than beverage material held in the brewing material holder 30. Providing both needles and coupling mechanisms on these components allows for flexibility is selecting the holder 30 or the capsule when brewing a beverage.

Reusable capsules that are fillable by the user and which include top and bottom through-holes to accommodate the top and bottom needles can be used in place of the disposable, pre-packaged capsule. In this case, top and bottom tubes can be provided instead of top and bottom needles, as the capsule does not have a seal that must be pierced.

The brewing material holder 30 includes a frame 39 to provide a base for mesh material. The frame 39 supports the brewing material while the mesh material allows liquid to pass through and around the brewing material in order to brew the beverage. The frame 39 also adds structural support for the brewing material holder 30 to rigidly withstand the increased liquid flow provided by the pressure assembly. For example, the frame 39 can include longitudinal members 32 and circular cross members 36, although any suitable structural configuration is contemplated for use as the frame 39.

The frame can also include baffles 34 arranged on the interior portion of the frame 39, preferably on the frame 39 between the mesh areas, configured to urge brewing material within the brewing material holder 30 to move as liquid passes through it. The frame 39 includes a bottom end 33 that can be integrally formed with the rest of the frame 39 or can be removably attached at the bottom of the frame 39, for example, attached via a threaded interface. Blades 31 can be included on the outside of the bottom end 33 to encourage mixing of the liquid in the container 12 as brewing progresses. The bottom end 33 can be a solid bottom plate or can include mesh inserts, and in any case supports and contains the brewing material inside the brewing material holder 30. The brewing material holder 30 can include at least one holder handle 38 to facilitate lifting of the brewing material holder 30 from the container 12. The holder handle 38 can be fixed or, for example, pivotally attached at the top of the brewing material holder 30 by pivots.

Figure 4:
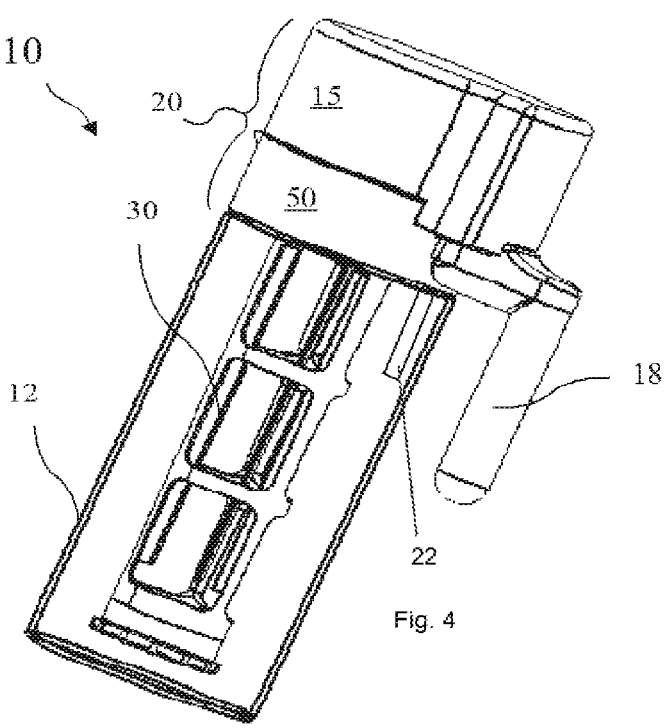
FIG. 4 shows an exemplary beverage brewing system including a heating element.

With reference to FIG. 4, the beverage brewing system 10 can include a heating element 22. This heating element 22 can be attached or removably coupled to the pressure assembly 14, so that the heating element 22 and the pressure assembly can be used alternatively or together, as desired by the user. Alternatively, the heating element 22 can be attached or removably coupled to the brewing material holder 30 or to the top 20. If the heating element 22 is removably coupled to any of these components, the coupling mechanism can be of any suitable type, such as a holster into which the heating element is secured, or a clip-on coupling mechanism, or any other type of device that will not affect the operation of the heating element 22. Preferably, the coupling mechanism maintains a suitable spaced relation between the heating element and other components of the beverage brewing system 10 to provide the most efficient heating of the liquid in the container, as well as to protect the other components from damage that could occur as a result of directly heating those components.

The heating element can be any type of element that is controllable to vary in temperature, for example, by varying the amount of electrical current flowing through the heating element 22. For example, the heating element can be a simple electrical coil, preferably enclosed in a heat-conducting sheath and having two insulated leads. Preferably, the sheath is also enclosed or tightly wrapped in a material that will transmit heat but will not break down when exposed to high temperatures over time, such as silicone or ceramic. Other types of heating elements can be used advantageously as part of the beverage brewing system, whether simple or more complex, and any such heating element is contemplated for use as part of the system, as would be apparent to those of skill in the art.

With reference to FIG. 5, a control assembly 40 is housed under the lid 15 in the top 20 and is configured to control operation of the pressure assembly and/or the heating element at the direction of a user. The control assembly 40 is shown schematically, because the particular embodiment can be any one of numerous control assemblies that can be used as an element of the present invention. For example, the control assembly 40 can be an electronic circuit, embodied on a circuit board and mounted under the lid 15 in the top 20. It will be apparent to those of skill in the art that numerous particular designs can be devised to provide the disclosed features of the control assembly 40, and it is contemplated that the present invention include any such design according to the broad description provided herein.

The control assembly provides a way to control aspects of the operation of the beverage brewing system 10, under the direction of the user, and to provide simple indications of the status of operation of the system to the user. For example, the control assembly can provide control over the extent and duration of operation of the pressure assembly and the heating element.

It will be appreciated by those skilled in the art that because brewed beverage is returned to the container 12 for recirculation by the action of the pressure assembly, the length of time that the pressure assembly is activated will affect the strength of the brewed beverage. For example, activating the pressure assembly for a short period of time will result in a mild brew, whereas allowing the pressure assembly to be activated for a longer period of time will increase the strength of the brew, given the same amount of beverage material present in the holder. If the pressure assembly is activated for a long enough time, the resulting brewed beverage will be of a concentrated strength. This concentrated brew can then be stored and used to make several brewed beverages on demand by diluting the concentrate, typically by adding additional liquid such as water or cream, or by adding ice to cool the beverage and dilute it as it melts.

Therefore, the control assembly is configured such that the duration of operation of the pressure assembly can be set by the user. The timer can be continuously variable, such as on a dial, so that the user can select a custom brew time. Alternatively, or in addition, the timer can have pre-set values corresponding, for example, to settings for mild, medium, strong, and concentrated brew strengths, and can be used in coordination with settings for the volume of liquid present in the container, which will affect the brew time necessary to achieve the desired brew strength.

The strength of the pressure provided by the pressure assembly can also be set by the user. For example, a medium setting can be selected if the user wants a typical brew, and a high setting can be selected if the user wants more pressure, to simulate a brew made by a French press, in which water under pressure is forced through a mass of ground beverage material that is concentrated by the pressure of the liquid flow. Further, the rate of flow determined by the pressure setting will affect the speed at which the beverage is brewed, particularly if it is cold-brewed. In some cases, if the heating element is used, a very low setting might be desirable, to provide circulation only while the beverage is hot-brewed or warmed up. As with the timer, the pressure setting can be continuously variable to provide custom pressure and/or have pre-sets to provide discrete steps in pressure variation.

Likewise, the extent and duration of operation of the heating element can also be set by the user. Through the use of the control assembly, the heat provided by the heating element can be varied depending, for example, on whether the user is using the heating element alone or in conjunction with the pressure assembly, or whether the beverage has already been cold-brewed and the user is merely warming the beverage before serving. The use of the heating element can also be timed such that it automatically shuts off after a predetermined amount of time, so as to avoid burning or over-heating the beverage.

Thus, through a combination of control of the extent and duration of the pressure and the heat, including no pressure at all and/or no heat at all as options, the amount of brewing material used, and the volume of liquid in the container, a truly custom brewed beverage can be provided through use of the beverage brewing system. Because different types of beverages can be brewed by the system, and because different users having different tastes might use the system, a number of pre-settable settings can be provided so that favorite combinations of settings can be set from memory. It is trivial for one of skill in the art, using discrete electronic elements and/or programmable components, to design a control assembly that provides the described features by, for example, controlling the current provided to the pressure assembly and heating element via electrical leads connecting the control assembly to the pressure assembly and heating element. Many different particular designs are possible, and the present invention is not limited by any one feasible design.

The control assembly can be powered by any known source, such as for example by direct current provided by batteries or a solar panel, alternating current provided via a plug configured to engage a wall socket, a spring-biased winding force, or by simple manual manipulation of a crank handle or other implement. Any transform or step-down of power necessary to run the control assembly and pressure and heating components can be provided by a power conditioner housed separately or as part of the control assembly. The brewer can be configured to run off a battery unless plugged in to an AC power source, and the battery can be rechargeable via a standard AC plug or USB connector. When running on battery power, the brewer can be arranged as a compact, portable unit.

As shown, the container cap 50 engages the container 12 during the brewing process, and the brewing material holder 30, pressure assembly 14, and heating element are all coupled, directly or indirectly to the top 20. Further, the control assembly 40 is housed under the lid 15 in the top 20. Thus, by uncoupling and lifting the top 20 from the container 12, the active components of the system 10 can be separated from the container 12 after the beverage is brewed. Therefore, the container can be large enough to hold several servings, and a spout 54 can be provided to facilitate pouring brewed drink from the beverage brewing device 10 to individual cups. Alternatively, the container can be sized for a single serving, and can function as the drinking cup after brewing. Because of the flexibility provided by the separable design, any container that is compatible in size and shape with the container cap 50 can be used to brew a beverage using the system, and the system as described is a versatile, portable system that can be used with any container to provide a brewed beverage anywhere. For example, the system can be used to provide a large quantity of beverage rapidly for a group of people, as well as to provide a single serving of beverage for an individual user on demand.

Figure 6:
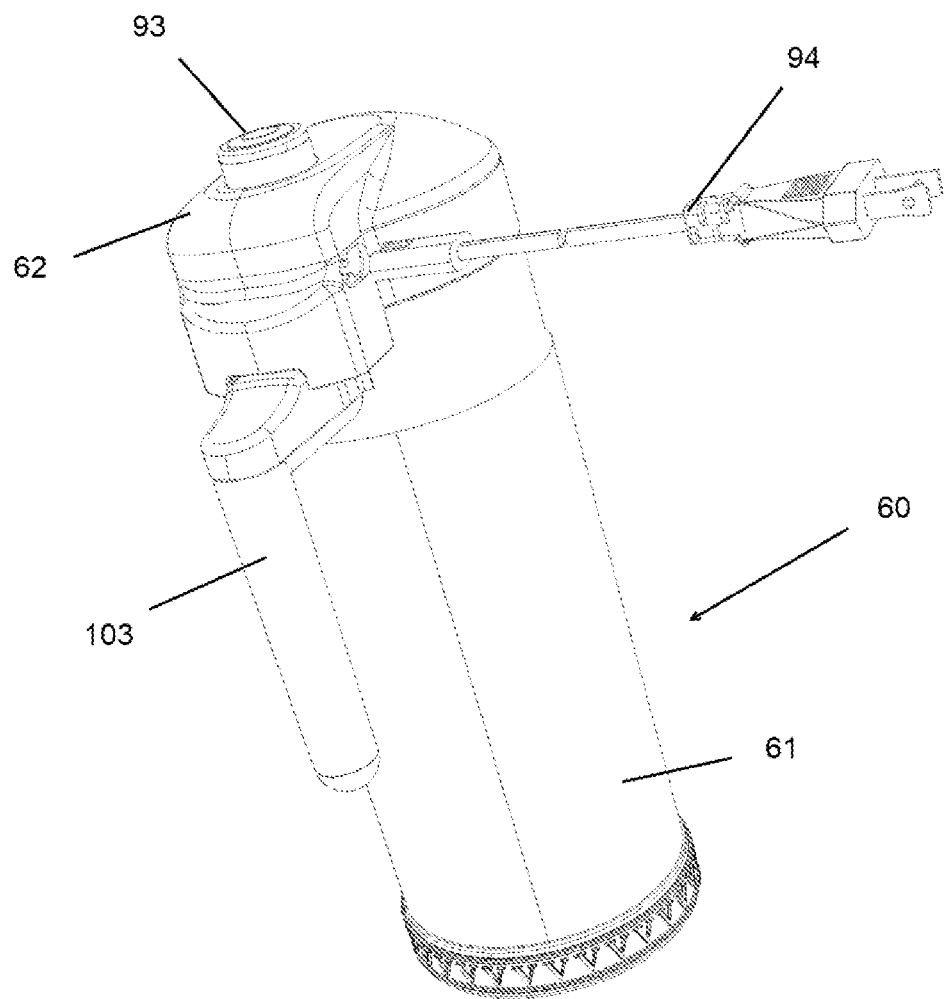
FIGS. 6 and 7 show different views of an exemplary embodiment of the beverage brewer of the invention.
Figure 7:
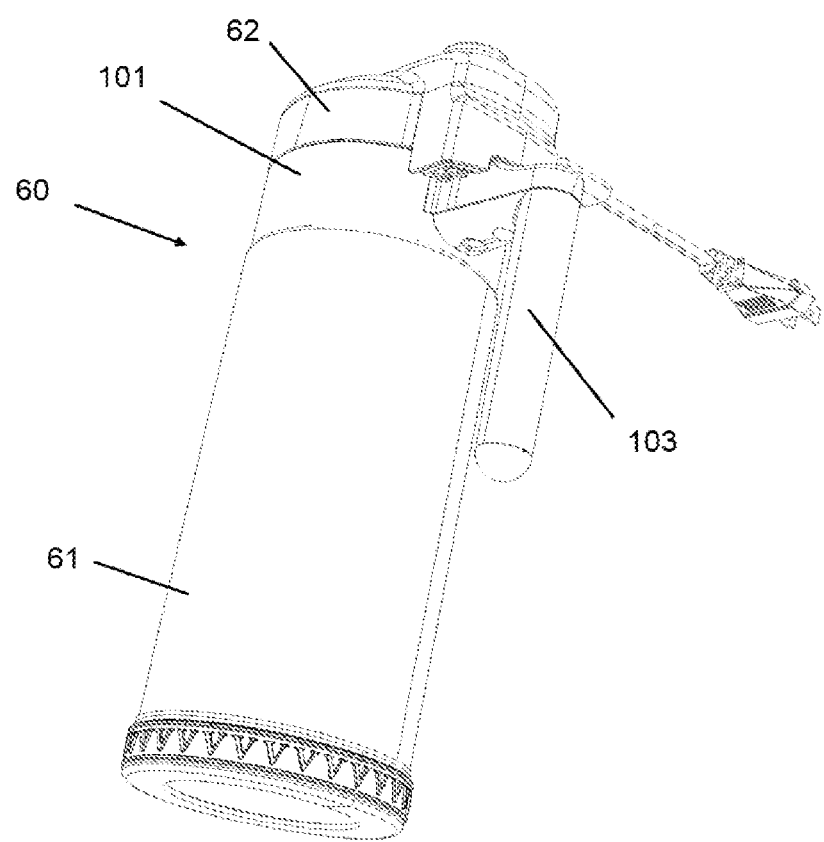
Figure 8:
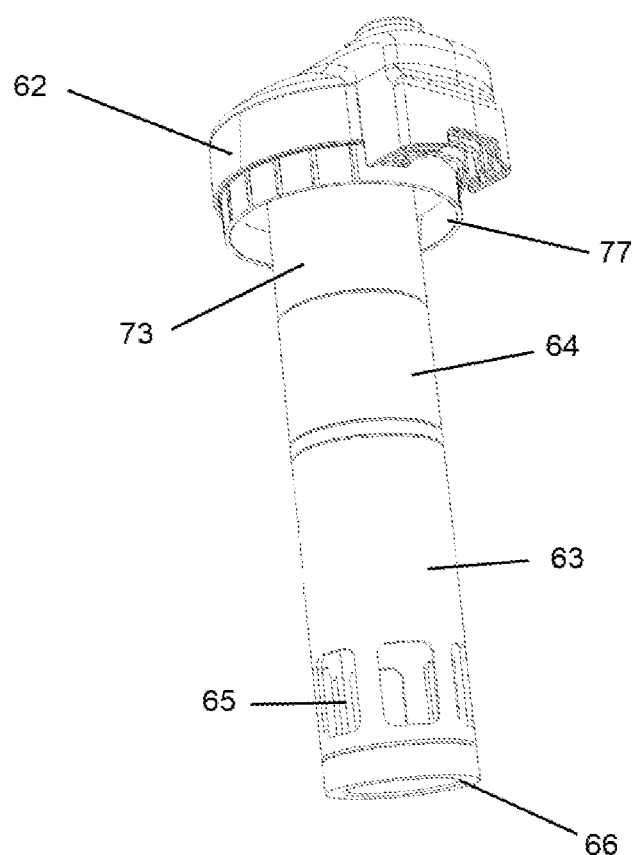
FIG. 8 shows the embodiment of FIGS. 6 and 7 with the container removed.

A particular embodiment of the beverage brewer of the invention is shown in FIGS. 6 and 7. As shown, the beverage brewer 60 includes a container 61 configured to hold liquid. The container 61 has an open top, which is shown covered by a lid 62. As shown in FIG. 8, the brewer 60 includes a brewing material holder 63 that is configured to hold beverage brewing material, and a pressure assembly 64 that is operable to provide pressurized liquid flow through the brewing material holder 63 within the container 61. The brewing material holder 63 can be suspended into the container 61 so as to hold beverage brewing material in contact with liquid held in the container 61, or can be arranged above the container 61. The brewing material holder 63 is shown as a tubular element having open portions 65 in the sidewall. These open portions 65 can be covered with a mesh material, so that liquid from the container 61 can flow through the brewing material holder 63 while the brewing material is held within the holder 63. However, if the brewer 60 is to be used exclusively with pre-packaged beverage pods, re-usable beverage pods, mesh packets of beverage material, or any other configuration of beverage material that doesn't required loose beverage brewing material, the open portions 65 can be left open, so long as the openings are small enough to hold the beverage material configuration within the holder 63 during the brewing process.

The brewing material holder 63 can also include an end cap 66 that includes a mesh filter insert, to allow liquid flow through the end of the holder 63 during the brewing process. If the pressure assembly 64 is used to apply pressure such that the flow is directed toward the end cap 66, beverage brewing material within the holder 63 will compact against the mesh portion of the end cap 66, forming a mass of beverage brewing material through which the liquid is forced, in effect providing a French press type of brewing action.

The pressure assembly 64 in this embodiment includes a simple pump as the pressure source, having two ports. If the particular pump used only operates in one direction, the ports are dedicated input and output ports. On the other hand, if the pump is bi-directional, each port functions as an input or an output depending on the direction in which the pump is operating. A mesh end cap or insert could therefore also be arranged at the pump end of the brewing material holder 63, to prevent brewing material being sucked into the pump if the flow is directed toward the pump.

Figure 9:
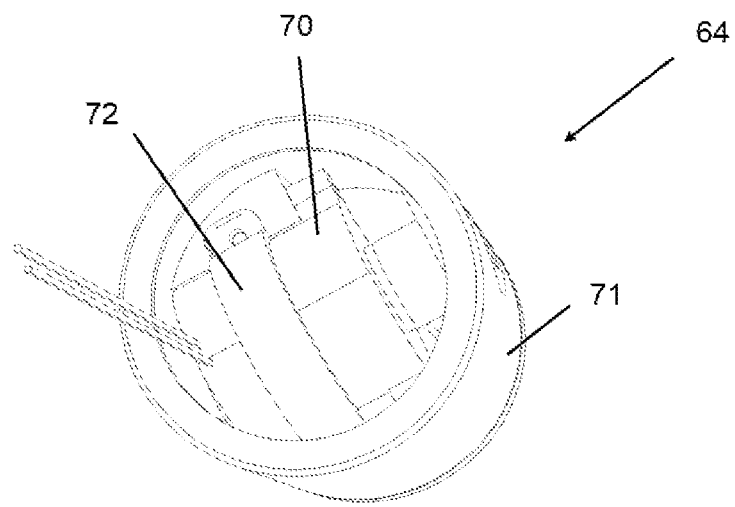
FIGS. 9-11 show the arrangement of the pump in the pump housing.
Figure 10:
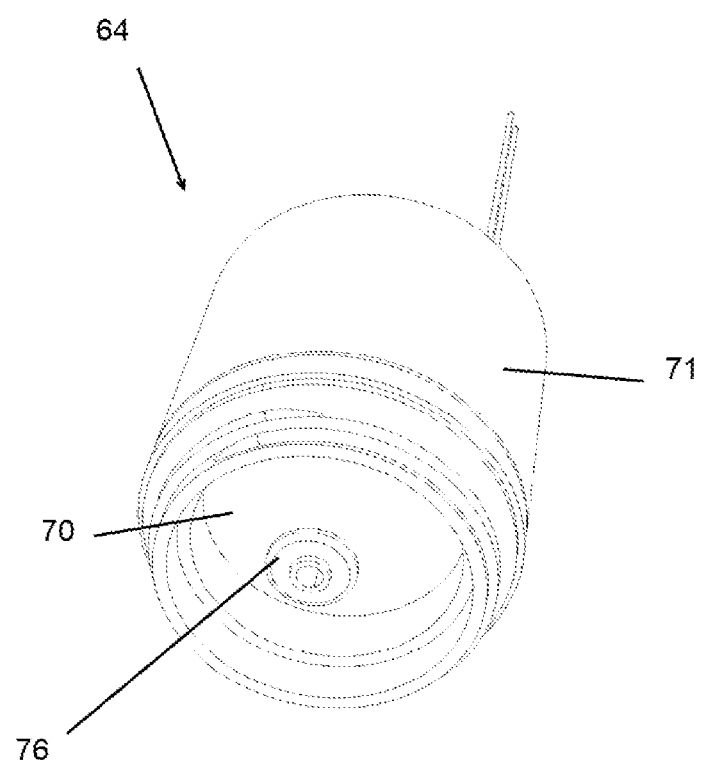
Figure 11:
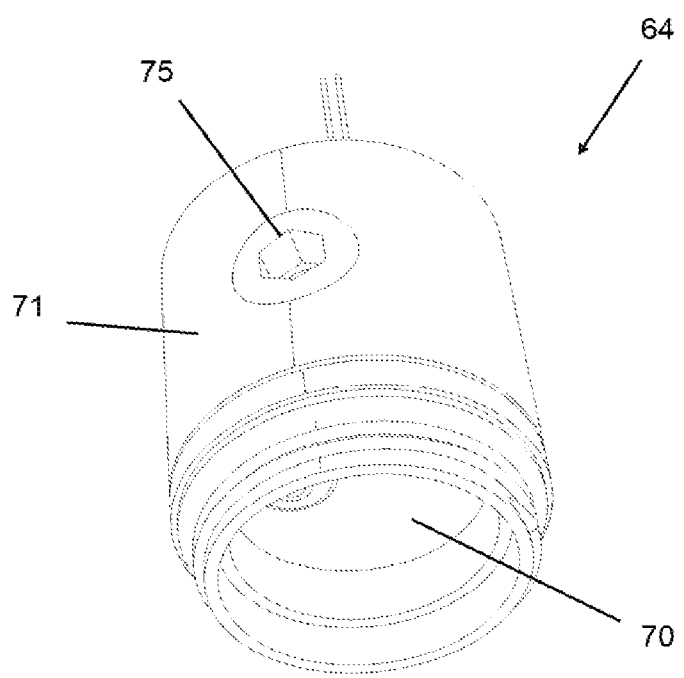

The pressure assembly 64 in this embodiment is configured to be removably coupled at the top of the container 61 and the brewing material holder 63 is configured to be removably coupled to the pressure assembly 64. As shown in FIGS. 9-11, the pressure assembly 64 includes a pump 70, which is connected to a pump housing 71 by a bracket 72 or other connector. The pump housing 71 is removably coupled to a pump housing connector 73, in this case via a threaded screw-on connector, although any type of coupler can be used, such as a friction-fit or snap-fit connector. Preferably, a resilient gasket such as a silicone washer is disposed at the threaded connection to form a fluid-tight seal.

Figure 12:
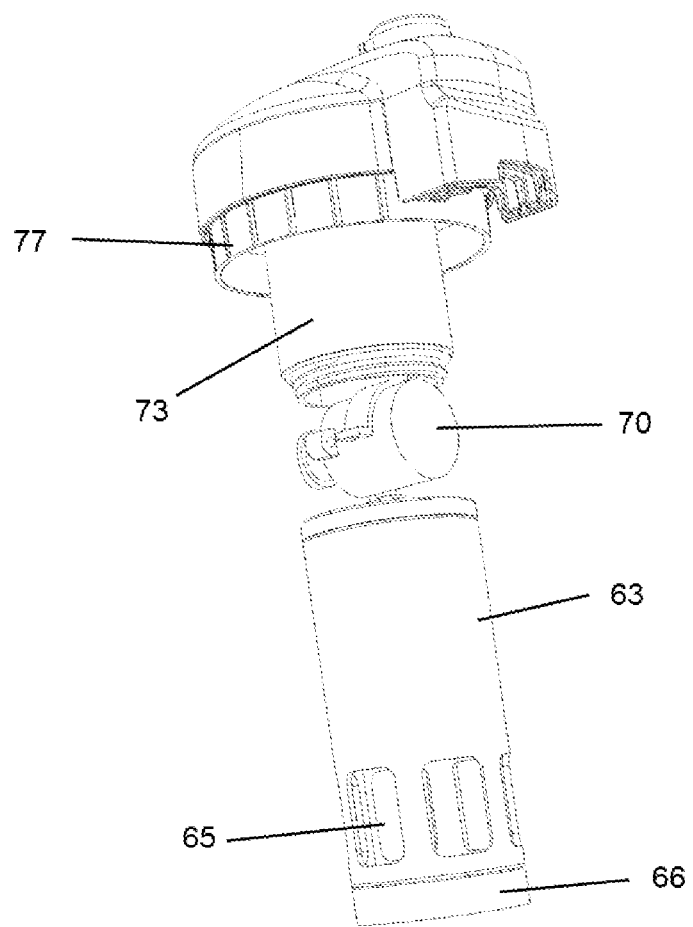
FIGS. 12-14 show the arrangement of the pump in the embodiment of FIGS. 6 and 7.
Figure 13:
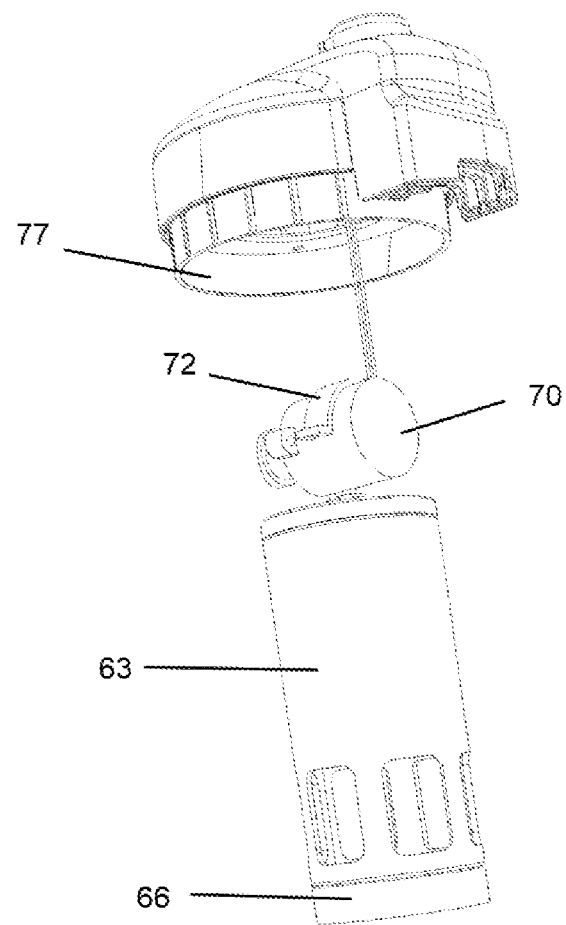
Figure 14:
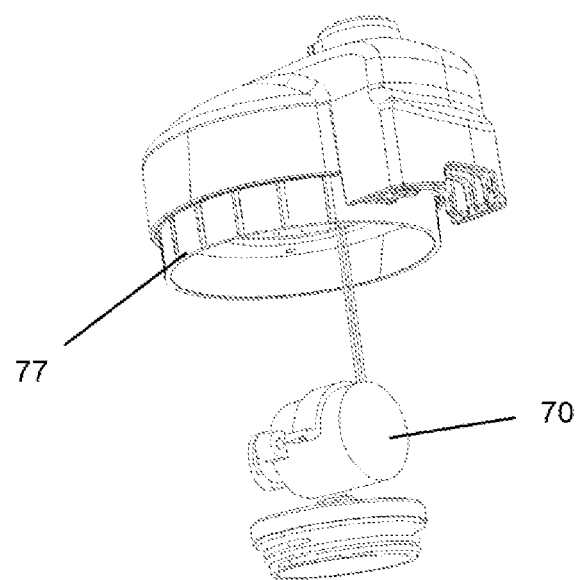

The pump 70 is housed within the pump housing 71, which includes a through-hole 75 in the sidewall to accommodate one of the ports of the pump 70, to provide the pump 70 with fluid access to liquid held in the container 61. The pump housing 71 also includes a through-hole 76 in an end of the housing to accommodate the other port of the pump 70, to provide the pump 70 with fluid access to the interior of the brewing material holder 63. The pump housing 71 also protects wires connecting the pump 70 to power and control circuitry. The pump housing connector 73 is secured to a pump chassis 77 at the top of the container 61. Thus, in this embodiment, the pressure assembly 64 includes the pump 70, pump housing 71, bracket 72, pump housing connector 73, and pump chassis 77. Any other pressure assembly arrangement that locates the pump to flow liquid through the brewing material holder 63, as shown in FIGS. 12-14, is contemplated as being included within the scope of the invention.

Likewise, the pump housing 71 is removably coupled at the other side to the beverage material holder 63, in this case via a threaded screw-on connector, although any type of coupler can be used, such as a friction-fit or snap-fit connector. Preferably, a resilient gasket such as a silicone washer is disposed at the threaded connection to form a fluid-tight seal. Therefore, in this embodiment, the pressure assembly 64 is removably coupled to the top of the container 61, and the brewing material holder 63 is removably coupled to the pressure assembly 64. The pressure assembly 64 draws liquid in from the container 61 through the side port, and provides the liquid under pressure to the interior of the beverage material holder 63. The flow of the liquid from the pressure assembly 64 through and around the beverage brewing material brews the beverage, and when unheated liquid is used, brewing takes place more rapidly than it would without the flow provided by the pressure assembly 64. If the flow is strong enough, the beverage brewing material is pushed and compacted against the mesh of the end cap 66, thereby providing a brewed beverage in a manner similar to that of a French press. In any case, the brewed beverage is then expelled into the container 61 through the mesh portions of the holder 63, where it recirculates through the pump 70 until brewing is finished.

If the pump 70 is configured to operate in the opposite direction, that is, to provide negative flow at the beverage material end, liquid held in the container 61 is sucked into the brewing material holder 63 through the mesh portions in the end cap 66 and/or sidewall, and a beverage is brewed in the holder 63. The brewed beverage is then expelled back into the container 61 through the other pump port. In this case, a mesh panel must also be provided at the pump end of the brewing material holder 63, to prevent beverage brewing material from being pulled into the pump 70.

Figure 15:
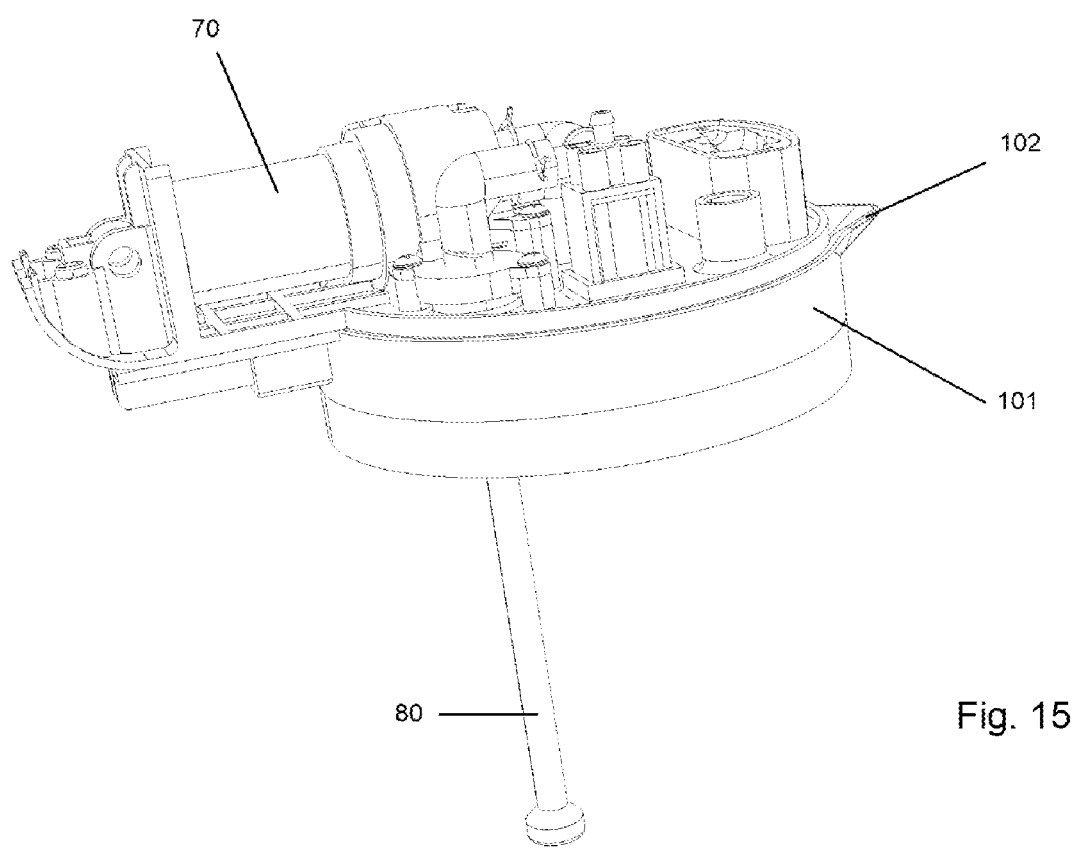
FIG. 15 shows an exemplary embodiment in which the pump is arranged above the container, including an intake tube.

As shown in FIG. 15, the pump 70 can be arranged above the container 61, in which case a tube 80, which can be an intake tube or outflow tube, or similar element is coupled to the pump 70 such that an end would extend into the interior of the container 61, to draw or expel liquid from or into the container 61 during the brewing process. For example, a first end of an intake tube 80 can be coupled to the inlet port of the pump 70 in any arrangement of the pump 70, with the second end configured to be arranged within an interior of the container 61. Different sized containers can be used to brew different amounts of beverage, but the intake tube 80 allows liquid to be drawn from a lower level of the container 61, so that, for example, a user can brew a single serving of beverage even when a larger container is used. The tube 80 can be made of a rigid material, or can be made from a resilient material to provide flexibility, which is particularly beneficial if the tube 80 is raised and lowered with respect to the container 61 when the lid is raised and lowered.

Further, although the beverage brewer shown in the exemplary embodiment is configured as described above, the pressure assembly 64 and brewing material holder 63 can be swapped in position. That is, the brewing material holder 63 can instead be configured to be removably coupled at the top of the container 61, and the pressure assembly 64 can be configured to be removably coupled to the other end of the brewing material holder 63. The pressure assembly 46 would still draw liquid from the container 61, either directly or through the holder 63, depending on the direction of flow provided by the pump 70. A beverage would be brewed in the holder 63 as a result of the flow of liquid through and around the beverage brewing material, which would then be expelled into the container 61, either directly or through the mesh portions of the holder 63, again depending on the direction of flow provided by the pump 70.

Further, the beverage brewer can be used to brew a beverage from a pre-packaged, sealed container of beverage brewing material, such as a pre-packaged beverage pod or capsule. In this case, the beverage material holder is sealed and includes the beverage brewing material. In addition to the pump having an inlet port and an outlet port, the pressure assembly in this type of embodiment has an injection nozzle arranged at the outlet port and configured to pierce a seal of the beverage material holder and to provide liquid under pressure from the container to an interior of the beverage material holder in order to provide a brewed beverage from the beverage brewing material. The injection nozzle can be, for example, a hollow needle with a pointed tip that can pierce the seal of the pod to enter the interior of the pod and provide liquid from the outlet port to the beverage material in the pod, in order to brew the beverage. Likewise, an outflow nozzle, such as a hollow needle, is configured to pierce the beverage material holder to receive the brewed beverage and provide the brewed beverage from the interior of the pod to the container. Preferably, the interior of the pod includes a mesh element to hold the beverage material in place while the liquid passes through, so that only the brewed beverage passes into the container. Once brewed and provided to the container, the beverage can be recirculated through the pod until the desired beverage strength is achieved.

Figure 16:
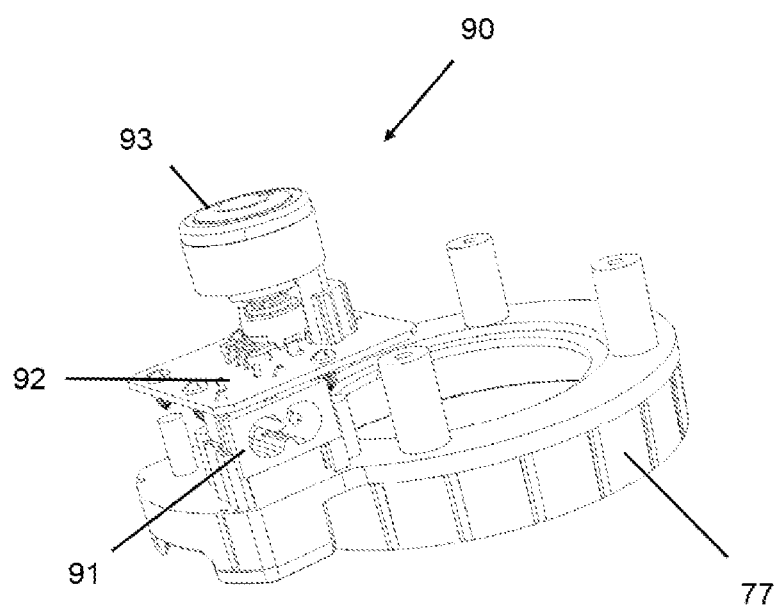
FIGS. 16 and 17 show an exemplary control assembly of the invention.
Figure 17:
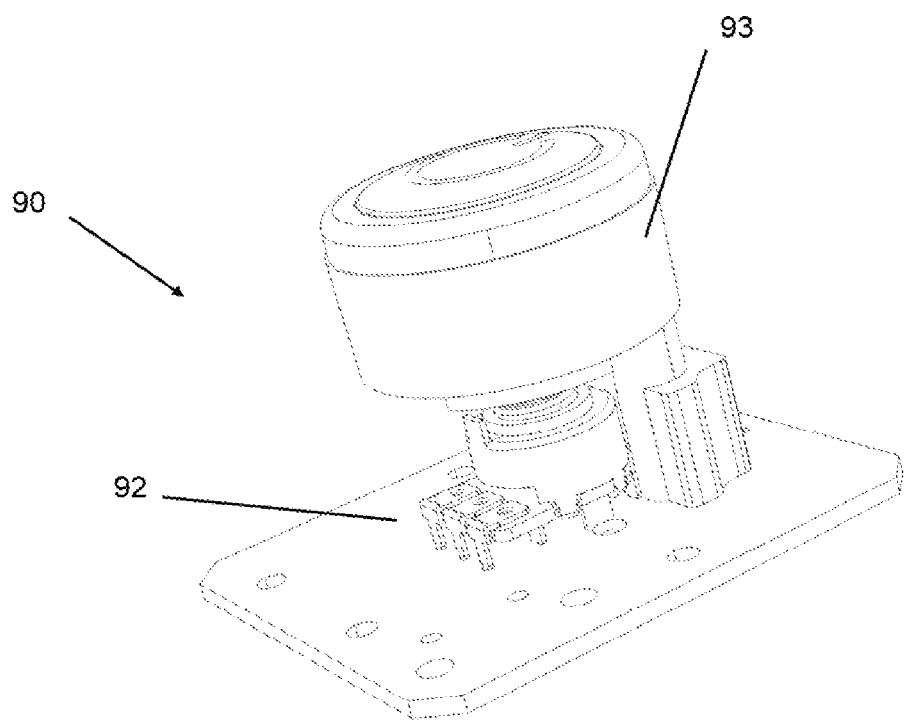

As shown in FIGS. 16 and 17, a control assembly 90 is mounted on or above the pump chassis 77, under the lid, or anywhere else that is convenient on the body of the beverage brewer. The control assembly 90 is operable by a user to control functions of the pressure assembly. For example, the control assembly 90 can be operable to actuate of the pressure assembly, set or change the direction of pressure provided by the pump, set the level of pressure provided by the pump, and set the duration of actuation of the pressure assembly. Thus, the control assembly 90 can be used to control the level and duration of flow of liquid through the beverage material holder to brew the beverage, including variations in the pumping action, such as pulsing the pressure or automatically periodically reversing the flow. The control assembly 90 preferably also manages power for the brewer. For example, an interface 91 on the control assembly can receive power from an AC source via a common plug and cord 94, and then step-down or transform the received power as necessary to provide appropriate power to the control circuitry 92 and pump.

It would be trivial for someone of ordinary skill in the art to design the particular control assembly used to control the pressure assembly, and it is contemplated that the invention includes any such design. For example, it would be simple to design control circuitry 92 for controlling the pump and to assemble the circuits components on a printed circuit board, connected to the pressure assembly by the wiring necessary to power the pump. A movable switch such as a knob 93 can be used to change pump parameters by the user. For example, pressing the knob 93 can result in actuating the pump and turning it off, and the knob 93 can be turned to select different operational modes. Continuously-variable parameters can be selectable, and preset modes can be programmed, for flexibility, or a simple on-off push-button function can be enabled. For example, the extent to which the knob 93 is turned can control the extent to which current flows to the pump and the corresponding pressure level provided by the pump to expel or suck liquid through the beverage material holder. The control circuitry 92 can include a timing circuit or other timing element, which can be operable by the user to program the amount of time that the pump will be operable.

As shown, the beverage brewer also includes a container lid 62, a collar 101 with a pour spout 102, and a handle 103. The lid 62 as shown is hingedly connected to the pump chassis, but in other embodiments it can be removably coupled in some fashion to the open top of the container. Further, in other embodiments the pressure assembly can be removably coupled to the container lid 62 and the beverage material holder can be configured to be removably coupled to the pressure assembly, so that the pressure assembly and beverage material holder can be lifted from the container by the lid 62. Alternatively, the beverage material holder can be configured to be removably coupled to the container lid 62 and the pressure assembly can be configured to be removably coupled to the beverage material holder.

Figure 18:
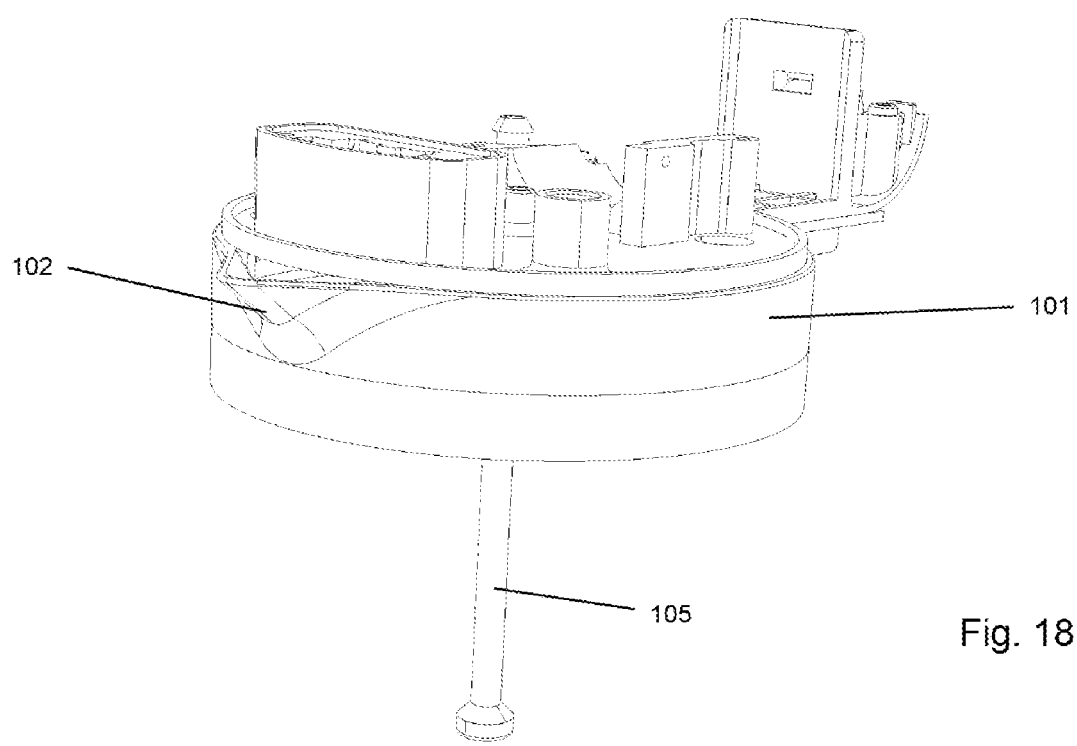
FIG. 18 shows an exemplary embodiment of an upper section of the brewer, including a heating element.

Referring to FIG. 18, the beverage brewer can also include a heating element 105. When arranged at least partially in the interior of the container, the heating element 105 can be operable to heat liquid held in the container. As mentioned above, the liquid can be heated to hot-brew the beverage rather than cold-brew it, or it can be used to warm the beverage to a desired drinking temperature after it is cold-brewed. The heating element 105 can be attached to another element or assembly of the brewer, or can be removably coupled to another element or assembly. The heating element 105 can be of any type know to those of skill in the art that is immersible, and preferably is controllable, for example, to be turned on and off and to determine the level of heat provided by the heating element 105. The heating element 105 can be actuated, for example, by providing the heating element 105 with current. Preferably, an internal component of the heating element 105 is raised in temperature when current is applied, and this internal component is covered by a material that transfers heat but provides protection from the liquid for the component and any terminals or connectors.

For example, the heating element can be attached or removably coupled to the container lid such that at least a portion of the heating element is arranged in an interior of the container, operable to heat liquid held in the container, when the lid covers the opening of the container. For example, the heating element can be attached to an inside portion of the lid, and when the lid is lowered into position onto the top of the container, at least an end of the heating element is submerged in the liquid in the container, and can heat the liquid when actuated. Actuation and control of the heating element can be effectuated by using the control assembly 90, as described in more detail below, or actuation of the heating element can be automatic, or pre-programmed to be automatic, on closure of the lid, through the use of an interlock switch or other mechanism.

Instead of being attached or removably coupled to the container lid, the heating element can be attached or removably coupled to the container, the pressure assembly, or the beverage material holder such that at least a portion of the heating element is arranged in an interior of the container. If removably coupled, the component to which the heating element is removably coupled can include a holster, sleeve, or other pocket-like arrangement that holds the heating element in place while in use, and from which the heating element is easily removed. Alternatively, the component to which the heating element is removably coupled can include a plug, socket, or other fixture to which the heating element can be coupled by snapping or screwing into place, or by otherwise mating for a secure connection. In any case, the coupled heating element should be arranged in a position to heat the liquid in the container and to be electrically coupled to the control assembly so as to receive operational power, and preferably to be functionally controlled by a user.

The control assembly 90 is operable to control actuation of the heating element, a temperature of the heating element, and/or a duration of use of the heating element. In this way, the user can turn the heating element on and off, to control whether the beverage is hot-brewed or cold-brewed. The user can also control the temperature of the heating element, to set the brewing temperature to the user's particular taste, and the brewing temperature can affect certain aspects of the beverage's flavor. The amount of time that the heating element is actuated can also affect the flavor of the brewed beverage, and therefore can also be controlled using the control assembly 90. The user can also choose to leave the heating element off during the brewing process, to cold-brew the beverage, and then set the heating element to a low setting to warm the brewed beverage to a suitable drinking temperature after brewing.

Through combination of settings of the control assembly affecting the pressure assembly and the heating element, myriad beverage brewing variations are possible, enabling the beverage brewing device of the invention to provide a truly custom-brewed beverage. By fine-tuning the extent, timing, and direction of the pump action and the extent and timing of the heating action, a precise brewing experience is possible. Presets for different users and even for different beverages for the same user can be provided by the control assembly, so that when a perfect beverage is experienced by a user, the settings can be recreated even if another user has changed the settings.

To provide more precision in producing a brew strength desired by the user, the volume of liquid in the container can be taken into account. Specifying the force of the pump and duration of the pump action will lead to consistent beverage strength only if the volume of liquid used to brew the beverage is consistent. Variation in this volume of liquid will lead to a corresponding variation in beverage strength even if the pressure and heating settings remain constant. However, if the volume of liquid is determined before the brewing process takes place, adjustments can be made to the brewing parameters to provide a consistently brewed beverage.

One way to achieve this precision is by providing a beverage brewer that is designed to be used with a number of different containers, each of which has a different volume. Each container includes an indicator configured to denote a volume of the container. For example, the indicator can be physical, such as a notch or series of notches at the upper edge of the container, the size or number of which indicates the volume of the container. Alternatively, the containers could include a magnetic stripe, or an electronic chip, or a color-coded scheme, indicating the volume of the container. The control assembly for such an embodiment includes a sensor configured to detect the indicator and to adjust the duration of actuation of the pressure assembly based at least in part on the volume of the container denoted by the indicator.

For even more precision, the actual volume of liquid in the container can be detected. Even if the volume of the container is known and adjusted for, there could be variation in the actual amount of liquid held in the container. Different schemes known to those of skill in the art can be used to determine the actual volume of liquid held in the container, rather than just the container volume. For example, a float indicator can be used, or a plumb-line sensor can be used, to detect the level of the fluid in the container, which in turn can be used to calculate the volume based on known container dimensions. Thus, an indicator is configured to denote a volume of liquid held in the container and the control assembly includes a sensor configured to detect the indicator and to adjust the duration of actuation of the pressure assembly based at least in part on the denoted volume of the container. Compensating for variations in liquid volume in this manner results in consistency of beverage strength.

Of course, although the combination of pressure and heating provides more variation in brewing a beverage, the invention encompasses embodiments in which only the pressure assembly, or only the heating element, is provided, as each on its own provides benefits and advantages over a conventional beverage brewer. For example, use of the pressure assembly alone provides a quicker cold-brewed beverage than does a conventional cold-brewer, and use of a sous vide-style heating process alone provides more precise hot-brewing of a beverage than does a conventional hot-brewer, and allows for warming of a cold-brewed beverage brewed by a conventional cold-brewer.

Thus, the beverage brewer of the invention encompasses any embodiment including container means for holding liquid having an open top, brewing material holding means for being suspended into the container means and for holding beverage brewing material in contact with liquid held in the container means, and pressure means for providing pressurized liquid flow through the brewing material holding means within the container means. The beverage brewer of the invention also encompasses any embodiment including container means for holding liquid having an open top, brewing material holding means for being suspended into the container means and for holding beverage brewing material in contact with liquid held in the container means, and heating means, arranged at least partially in an interior of the container means, for heating liquid held in the container means. Of course, the beverage brewer of the invention also encompasses any embodiment including both the pressure means and the heating means.

As described, the brewing device of the present invention can be used for both hot- and cold-brewing, and is configured to speed the cold-brewing process if desired. The brewer has the ability to use either loose beverage brewing material or a simple drop-in portion of pre-packaged brewing material provided in a liquid-permeable capsule or other container. Particular embodiments of the brewer replicate the effect of a French press, by adding a pressure feature to the brewing process. Use of the brewer of the invention is flexible and convenient, and simplifies removal of the brewing material and clean-up of the brewer. The brewer can be provided as a unit with a small footprint to save counter space, and can be portable, to brew a beverage while on the go.

The present invention has been described by way of example and in terms of preferred embodiments. However, the present invention as contemplated by the inventor is not strictly limited to the particularly disclosed embodiments. To the contrary, various modifications, as well as similar arrangements, are included within the spirit and scope of the present invention. The scope of the appended claims, therefore, should be accorded the broadest reasonable interpretation so as to encompass all such modifications and similar arrangements.

I claim:

1. A beverage brewer, comprising:
   a container configured to hold liquid and having an open top;
   a brewing material holder configured to hold beverage brewing material; and
   a pressure assembly operable to provide pressurized liquid flow through the brewing material holder by causing a pressure difference between two open portions of the brewing material holder, using a lower end of the pressure difference to draw liquid from the container to the brewing material holder and using a higher end of the pressure difference to flow the liquid through the brewing material holder back to the container;
   wherein:
      the pressure assembly is configured to be removably coupled at the top of the container; and
      the brewing material holder is configured to be removably coupled to the pressure assembly.

2. The beverage brewer of claim 1, wherein the brewing material holder is further configured to be suspended into the container.

3. The beverage brewer of claim 1, wherein the brewing material holder is further configured to hold the beverage brewing material in contact with liquid held in the container.

4. The beverage brewer of claim 1, wherein the pressure assembly includes a pump having an inlet port and an outlet port.

5. The beverage brewer of claim 4, wherein the pressure assembly also includes an intake tube coupled to the inlet port at a first end and having a second end configured to be arranged within an interior of the container.

6. The beverage brewer of claim 1, further comprising a control assembly that is operable to control at least one of actuation of the pressure assembly, a direction of pressure provided by the pressure assembly, a level of pressure provided by the pressure assembly, and a duration of actuation of the pressure assembly.

7. The beverage brewer of claim 1, further comprising a container lid configured to removably couple to the open top of the container.

8. The beverage brewer of claim 1, further comprising a heating element that is configured to be arranged at least partially in an interior of the container and operable to heat liquid held in the container.

9. The beverage brewer of claim 8, wherein the heating element is configured to be removably coupled to the container such that at least a portion of the heating element is arranged in an interior of the container.

10. The beverage brewer of claim 8, further comprising a control assembly that is operable to control at least one of actuation of the heating element, a temperature of the heating element, and a duration of use of the heating element.

11. A process of brewing a beverage, comprising:
    providing beverage brewing material within the beverage material holder of the beverage brewer of claim 1;
    providing a liquid to the interior of the container;
    operating the pressure assembly to provide pressurized flow of the liquid from the container through the brewing material holder, thereby brewing a beverage from the beverage brewing material; and
    providing the brewed beverage to the container.

12. The beverage brewer of claim 1, wherein the pressure assembly is configured to be operably arranged at least partially outside the brewing material holder.

13. The beverage brewer of claim 1, wherein the pressure assembly includes a single pump.

14. The beverage brewer of claim 13, wherein the pump is bidirectional.

15. The beverage brewer of claim 1, wherein the pressure assembly is operable to provide the pressure difference in a constant manner for repeated continuous liquid flow from the container, through the brewing material holder, and back to the container.

16. The beverage brewer of claim 1, wherein the brewing material holder is configured to be directly coupled to the pressure assembly.

17. The beverage brewer of claim 1, wherein the brewing material holder is configured to be indirectly coupled to the pressure assembly.

18. A beverage brewer, comprising:
    a container configured to hold liquid and having an open top;
    a brewing material holder configured to hold beverage brewing material; and
    a pressure assembly operable to provide pressurized liquid flow through the brewing material holder by causing a pressure difference between two open portions of the brewing material holder, using a lower end of the pressure difference to draw liquid from the container to the brewing material holder and using a higher end of the pressure difference to flow the liquid through the brewing material holder back to the container
    wherein:
       the brewing material holder is configured to be removably coupled at the top of the container; and
       the pressure assembly is configured to be removably coupled to the brewing material holder.

19. The beverage brewer of claim 18, wherein the brewing material holder is further configured to be suspended into the container.

20. The beverage brewer of claim 18, wherein the brewing material holder is further configured to hold the beverage brewing material in contact with liquid held in the container.

21. The beverage brewer of claim 18, wherein the pressure assembly includes a pump having an inlet port and an outlet port.

22. The beverage brewer of claim 21, wherein the pressure assembly also includes an intake tube coupled to the inlet port at a first end and having a second end configured to be arranged within an interior of the container.

23. The beverage brewer of claim 18, further comprising a control assembly that is operable to control at least one of actuation of the pressure assembly, a direction of pressure provided by the pressure assembly, a level of pressure provided by the pressure assembly, and a duration of actuation of the pressure assembly.

24. The beverage brewer of claim 18, further comprising a container lid configured to removably couple to the open top of the container.

25. The beverage brewer of claim 18, further comprising a heating element that is configured to be arranged at least partially in an interior of the container and operable to heat liquid held in the container.

26. The beverage brewer of claim 25, wherein the heating element is configured to be removably coupled to the container such that at least a portion of the heating element is arranged in an interior of the container.

27. The beverage brewer of claim 25, further comprising a control assembly that is operable to control at least one of actuation of the heating element, a temperature of the heating element, and a duration of use of the heating element.

28. A process of brewing a beverage, comprising:
providing beverage brewing material within the beverage material holder of the beverage brewer of claim 18;
providing a liquid to the interior of the container;
operating the pressure assembly to provide pressurized flow of the liquid from the container through the brewing material holder, thereby brewing a beverage from the beverage brewing material; and
providing the brewed beverage to the container.

29. The beverage brewer of claim 18, wherein the pressure assembly includes a single pump.

30. The beverage brewer of claim 29, wherein the pump is bidirectional.

31. The beverage brewer of claim 18, wherein the pressure assembly is operable to provide the pressure difference in a constant manner for repeated continuous liquid flow from the container, through the brewing material holder, and back to the container.

32. A beverage brewer, comprising:
a container configured to hold liquid and having an open top;
a brewing material holder configured to hold beverage brewing material; and
a pressure assembly operable to provide pressurized liquid flow through the brewing material holder by causing a pressure difference between two open portions of the brewing material holder;
wherein:
the pressure assembly includes a pump having an inlet port and an outlet port;
the beverage material holder is sealed and includes the beverage brewing material; and
the pressure assembly also includes:
an injection nozzle arranged at the outlet port and configured to pierce a seal of the beverage material holder and to provide liquid under pressure from the container to an interior of the beverage material holder in order to provide a brewed beverage from the beverage brewing material, and
an outflow nozzle arranged in fluid communication with an interior of the container and configured to pierce the beverage material holder and provide the brewed beverage from the interior of the beverage material holder to the container.

33. A beverage brewer, comprising:
a container configured to hold liquid and having an open top;
a brewing material holder configured to hold beverage brewing material;
a pressure assembly operable to provide pressurized liquid flow through the brewing material holder by causing a pressure difference between two open portions of the brewing material holder; and
a control assembly that is operable to control at least one of actuation of the pressure assembly, a direction of pressure provided by the pressure assembly, a level of pressure provided by the pressure assembly, and a duration of actuation of the pressure assembly;
wherein:
the container includes an indicator configured to denote a volume of the container; and
the control assembly includes a sensor configured to detect the indicator and to adjust the duration of actuation of the pressure assembly based at least in part on the denoted volume of the container.

34. A beverage brewer, comprising:
a container configured to hold liquid and having an open top;
a brewing material holder configured to hold beverage brewing material;
a pressure assembly operable to provide pressurized liquid flow through the brewing material holder by causing a pressure difference between two open portions of the brewing material holder;
a control assembly that is operable to control at least one of actuation of the pressure assembly, a direction of pressure provided by the pressure assembly, a level of pressure provided by the pressure assembly, and a duration of actuation of the pressure assembly; and
an indicator configured to denote a volume of liquid held in the container;
wherein the control assembly includes a sensor configured to detect the indicator and to adjust the duration of actuation of the pressure assembly based at least in part on the denoted volume of the container.

35. A beverage brewer, comprising:
a container configured to hold liquid and having an open top;
a brewing material holder configured to hold beverage brewing material;
a pressure assembly operable to provide pressurized liquid flow through the brewing material holder by causing a pressure difference between two open portions of the brewing material holder, using a lower end of the pressure difference to draw liquid from the container to the brewing material holder and using a higher end of the pressure difference to flow the liquid through the brewing material holder back to the container; and a container lid configured to removably couple to the open top of the container;

wherein:

the pressure assembly is configured to be removably coupled to the container lid; and the beverage material holder is configured to be removably coupled to the pressure assembly.

36. A beverage brewer, comprising:

a container configured to hold liquid and having an open top;

a brewing material holder configured to hold beverage brewing material;

a pressure assembly operable to provide pressurized liquid flow through the brewing material holder by causing a pressure difference between two open portions of the brewing material holder, using a lower end of the pressure difference to draw liquid from the container to the brewing material holder and using a higher end of the pressure difference to flow the liquid through the brewing material holder back to the container; and a container lid configured to removably couple to the open top of the container wherein:

the beverage material holder is configured to be removably coupled to the container lid; and the pressure assembly is configured to be removably coupled to the beverage material holder.

37. A beverage brewer, comprising:

a container configured to hold liquid and having an open top;

a brewing material holder configured to hold beverage brewing material;

a pressure assembly operable to provide pressurized liquid flow through the brewing material holder by causing a pressure difference between two open portions of the brewing material holder, using a lower end of the pressure difference to draw liquid from the container to the brewing material holder and using a higher end of the pressure difference to flow the liquid through the brewing material holder back to the container;

a container lid configured to removably couple to the open top of the container; and a heating element that is configured to be removably coupled to the container lid such that at least a portion of the heating element is arranged in an interior of the container, operable to heat liquid held in the container.

38. A beverage brewer, comprising:

a container configured to hold liquid and having an open top;

a brewing material holder configured to hold beverage brewing material;

a pressure assembly operable to provide pressurized liquid flow through the brewing material holder by causing a pressure difference between two open portions of the brewing material holder; and a heating element that is configured to be arranged at least partially in an interior of the container and operable to heat liquid held in the container wherein the heating element is configured to be removably coupled to the pressure assembly such that at least a portion of the heating element is arranged in an interior of the container.

39. A beverage brewer, comprising:

a container configured to hold liquid and having an open top;

a brewing material holder configured to hold beverage brewing material;

a pressure assembly operable to provide pressurized liquid flow through the brewing material holder by causing a pressure difference between two open portions of the brewing material holder; and a heating element that is configured to be arranged at least partially in an interior of the container and operable to heat liquid held in the container;

wherein the heating element is configured to be removably coupled to the beverage material holder such that at least a portion of the heating element is arranged in an interior of the container.

40. A beverage brewer, comprising:

a container configured to hold liquid and having an open top;

a brewing material holder configured to hold beverage brewing material;

a heating element configured to be arranged at least partially in an interior of the container and operable to heat liquid held in the container; and a pressure assembly operable to provide pressurized liquid flow through the brewing material holder within the container;

wherein the heating element is configured to be removably coupled to the pressure assembly such that at least a portion of the heating element is arranged in an interior of the container.

41. The beverage brewer of claim 40, wherein the brewing material holder is further configured to be suspended into the container.

42. The beverage brewer of claim 40, wherein the brewing material holder is further configured to hold the beverage brewing material in contact with liquid held in the container.

43. The beverage brewer of claim 40, wherein the heating element is configured to be removably coupled to the container such that at least a portion of the heating element is arranged in an interior of the container.

44. The beverage brewer of claim 40, wherein the heating element is configured to be removably coupled to the beverage material holder such that at least a portion of the heating element is arranged in an interior of the container.

45. The beverage brewer of claim 40, further comprising a control assembly that is operable to control at least one of actuation of the heating element, a temperature of the heating element, and a duration of use of the heating element.

46. The beverage brewer of claim 40, further comprising a container lid configured to removably couple to the open top of the container.

47. The beverage brewer of claim 46, wherein the heating element is configured to be removably coupled to the container lid such that at least a portion of the heating element is arranged in an interior of the container.

48. The beverage brewer of claim 40, further comprising a control assembly that is operable to control at least one of actuation of the pressure assembly, a direction of pressure provided by the pressure assembly, a level of pressure provided by the pressure assembly, and a duration of actuation of the pressure assembly.

49. A process of brewing a beverage, comprising:

providing beverage brewing material within the beverage material holder of the beverage brewer of claim 40;

providing a liquid to the interior of the container; and operating the heating element to heat the liquid in the container, thereby brewing a beverage from the beverage brewing material.

* * * * *